E. P. DAVIS.
MACHINE FOR PRESSING CORN-STALKS FOR FUEL.

No. 193,693. Patented July 31, 1877.

WITNESSES:
A. W. Almqvist
J. H. Scarborough

INVENTOR:
E. P. Davis
BY
ATTORNEYS.

UNITED STATES PATENT OFFICE.

EDGAR P. DAVIS, OF OMAHA, NEBRASKA, ASSIGNOR TO HIMSELF, JAMES E. DAVIS, JNO. FISK, AND WM. V. MORSE, OF SAME PLACE.

IMPROVEMENT IN MACHINES FOR PRESSING CORN-STALKS FOR FUEL.

Specification forming part of Letters Patent No. 193,693, dated July 31, 1877; application filed June 4, 1877.

*To all whom it may concern:*

Figure 1:
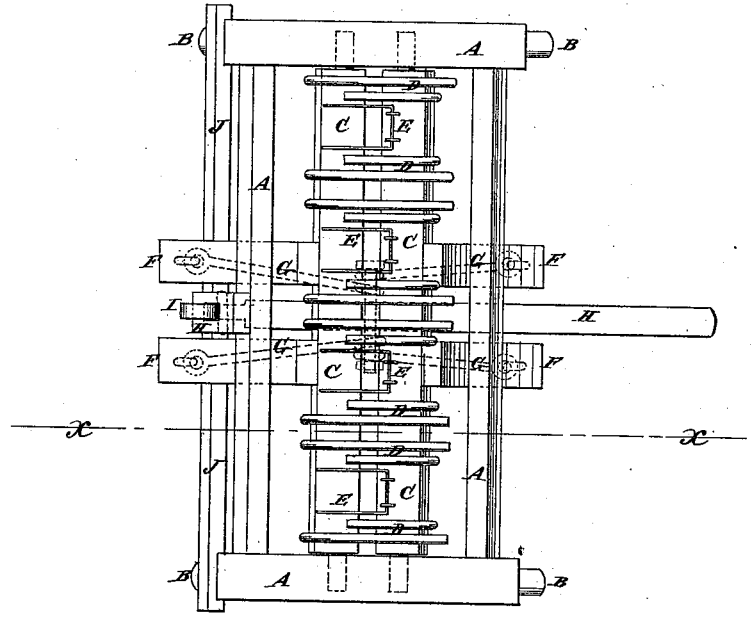
Figure 2:
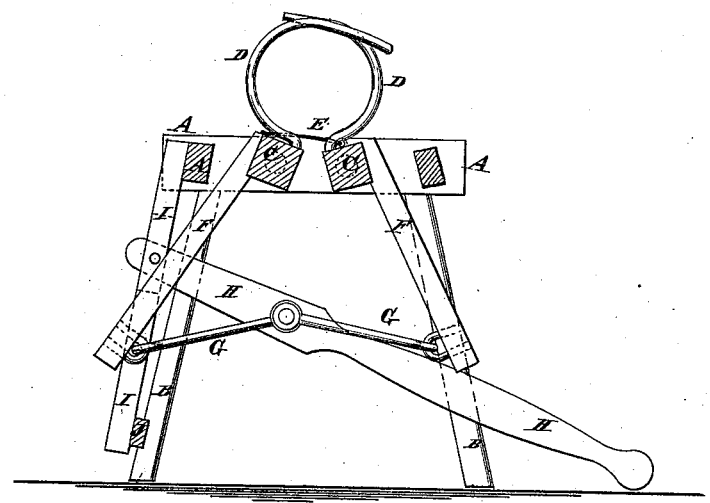

Be it known that I, EDGAR P. DAVIS, of Omaha, in the county of Douglas and State of Nebraska, have invented a new and useful Improvement in Machine for Pressing Corn-Stalks, &c., for Fuel, of which the following is a specification:

Figure 1 is a top view of my improved machine. Fig. 2 is a cross-section of the same, taken through the line *x x*, Fig. 1.

Similar letters of reference indicate corresponding parts.

The object of this invention is to furnish an improved machine for pressing corn-stalks, weeds, grass, and other similar substances into bundles for fuel, which shall be simple in construction, convenient and effective in use, and inexpensive in manufacture.

The invention consists in the combination of the rigid arms and the lever with the shafts, the hooks, and the frame of the machine; and in the combination of the guard-rods with the shafts and the hooks, as hereinafter fully described.

A is a horizontal frame, to which are attached legs B, of such a length as to raise the machine to a convenient height.

To the end bars of the frame A are pivoted the ends of two parallel shafts, C. To the shafts C are attached semicircular arms, bars, hooks, or jaws D, which are arranged in pairs, the pair of one of the shafts C being placed between the hooks of the corresponding pair of the other shaft. This leaves a narrow space between each set of four hooks, through which the saw is passed in sawing the long bundle into lengths.

To one of the shafts C are attached a number of rods or fingers, E, which lie upon the other shaft, and prevent any of the stalks from dropping into the space between the shafts and impeding their operation.

To each of the shafts C are rigidly attached two arms, F, to the lower ends of which are pivoted the outer ends of the rods G. The inner ends of the rods G are pivoted to the opposite sides of the lever H, two at each side, the rods G thus forming toggle-joints.

The inner end of the lever H is pivoted to a bar, I, the upper end of which is attached to a side bar of the frame A, and its lower end is attached to a bar, J, attached to the lower part of two of the legs B. The other end of the lever H projects in front of the machine, and may be operated by hand or foot, as may be desired or convenient.

In using the machine the free end of the lever H is raised to open the hooks D, the bands are laid upon the shafts C, and the corn-stalks or other material is laid into the space between the hooks. The free end of the lever H is then lowered, which forces the hooks D together with a constantly-increasing pressure, compressing the stalks into a compact bundle. The bands are then fastened and the bundle is cut into lengths; or it may be removed from the machine, and afterward cut into lengths, as may be desired or convenient.

Having thus described my invention, I claim as new and desire to secure by Letters Patent—

1. The combination of the rigid arms F, the pivoted rods G, and the lever H with the shafts C, the hooks D, and the frame of the machine, substantially as herein shown and described.

2. The combination of the rods E with the shafts C and the hooks D, substantially as herein shown and described.

EDGAR PULASKI DAVIS.

Witnesses:
JAMES T. GRAHAM,
C. SEDGWICK.